United States Patent [19]

McLaughlin et al.

[11] Patent Number: 5,088,021

[45] Date of Patent: Feb. 11, 1992

[54] APPARATUS AND METHOD FOR GUARANTEED DATA STORE IN REDUNDANT CONTROLLERS OF A PROCESS CONTROL SYSTEM

[75] Inventors: Paul F. McLaughlin, Hatfield; Pankaj H. Mody, Horsham, both of Pa.

[73] Assignee: Honeywell, Inc., Minneapolis, Minn.

[21] Appl. No.: 404,124

[22] Filed: Sep. 7, 1989

[51] Int. Cl.⁵ .............................. G06F 11/20
[52] U.S. Cl. ........................... 364/187; 371/9.1
[58] Field of Search .......... 364/187, 200, 184, 185, 364/186; 371/9.1

[56] References Cited

U.S. PATENT DOCUMENTS

| | | | |
|---|---|---|---|
| 4,131,944 | 12/1978 | Mager et al. | 364/200 |
| 4,484,263 | 11/1984 | Olson et al. | 364/200 |
| 4,581,701 | 4/1986 | Hess et al. | 371/9.1 |
| 4,607,256 | 8/1986 | Henzel | 364/187 |
| 4,694,396 | 9/1987 | Weisshaar et al. | 364/200 |
| 4,751,702 | 6/1988 | Beier et al. | 371/9.1 |
| 4,797,884 | 1/1989 | Yalowitz et al. | 371/9.1 |
| 4,837,676 | 6/1989 | Rosman | 364/200 |
| 4,958,270 | 9/1990 | McLaughlin et al. | 364/187 |
| 4,959,768 | 9/1990 | Gerhart | 364/187 |
| 5,008,805 | 4/1991 | Fiebig et al. | 364/184 |

FOREIGN PATENT DOCUMENTS 0038801 3/1984 Japan .......................... 364/187

*Primary Examiner*—Jerry Smith
*Assistant Examiner*—Thomas E. Brown
*Attorney, Agent, or Firm*—A. A. Sapelli; D. Lenkszus; A. Medved

[57] ABSTRACT

In a process control system, having at least one process control unit which includes redundant equivalent controllers to reduce the impact of failure of the controllers in the process control unit, a technique is provided to guarantee that interruption of either the active (primary) controller or the backup (secondary) controller will not adversely effect the storage of data signals or the execution of commands by the process control unit. In the present invention, an information message or packet sent to the process control unit and, hence, to the active controller is forwarded to the backup controller before a response in the form of acknowledgement message is returned to the device issuing the information message or packet. The information message or packet is therefore stored in the same order in both the active controller and the backup controller and is executed in the same order by either controller. This technique is particularly important in a process control network of a process control system to insure successful monitoring and control functions for the process.

5 Claims, 4 Drawing Sheets

APPARATUS AND METHOD FOR GUARANTEED DATA STORE IN REDUNDANT CONTROLLERS OF A PROCESS CONTROL SYSTEM

RELATED APPLICATIONS

The present application is related to the following:
1. U.S. patent application Ser. No. 07/299,857, entitled "APPARATUS FOR TRACKING PREDETERMINED DATA FOR UPDATING A SECONDARY DATA BASE", by P. Gerhart, filed on Jan. 23, 1989, now U.S. Pat. No. 4,959,768;
2. U.S. patent application Ser. No. 07/299,859, entitled "METHOD FOR CONTROL DATA BASE UPDATING OF A REDUNDANT PROCESSOR IN A PROCESS CONTROL ,SYSTEM", by McLaughlin et al, filed on Jan. 23, 1989, now U.S. Pat. No. 4,958,270;
3. U.S. Pat. No. 4,607,256, issued on Aug. 19, 1986, (reissue applied for, reissue Ser. No. 07,186,230, filed on Apr. 26, 1988);
4. U.S. Pat. No. 4,296,464, issued on Oct. 20, 1981;
all of the above U.S. Patent Applications being assigned to Honeywell Inc., the assignee of the present Application.

BACKGROUND OF THE INVENTION

1. Field of the Invention

This invention relates generally to the automated control of plants and factories and, more particularly, to the control unit that provides the interface with the gauges, valves, etc. that monitor and control the activity of the plants and factories.

2. Description of the Related Art

In the related art, the use of redundancy in associated processing and control circuits to prevent interruption of processes is well known. Using this technique, when an active member of the redundant circuits fails, then the here-to-fore inactive member becomes the active member and the processing can continue without interruption.

The modern process control systems frequently include a central control and data processing system which can be referred to as the plant control network. Exchanging signal groups with the plant control network are subsidiary units, which can be referred to as process control units. The process control units receive control instructions from the plant control network and forward status information to the plant control network. Based on the control instructions received from the plant control network and status signals from sensor devices monitoring the process activity, the process control unit can provide control signals to the devices actually used to determine the activity of the process. The process control unit can make local decisions, based on status signals, for changes required in the process and can transmit signals to the process control devices in an appropriate format, thereby relieving the plant control network of these activities.

When the process control unit includes redundant controllers, the instructions stored in each controller must be identical and, in addition, must be stored chronologically in the same order in each controller. Otherwise, when control changed from the primary or active controller to the redundant secondary or standby (inactive) controller, inappropriate decisions with potentially serious consequences can result.

A need has therefore been felt for apparatus and technique for insuring that the stored data groups used for process control in redundant controllers are identical and have been entered in storage units of the redundant controllers in the same order.

FEATURES OF THE INVENTION

It is an object of the present invention to provide an improved process control system for controlling the operation of factories and plants.

It is a feature of the present invention to provide an improved control unit for monitoring and controlling the operation of the factory or plant.

It is a further feature of the present invention to provide an improved process control unit having redundant controllers.

It is another feature of the present invention to provide apparatus and method for insuring that data stored in a controller and in a duplicate redundant controller are identical.

It is yet another and most significant feature of the present invention to insure the serialization of data stores in redundant controllers in process control units.

SUMMARY OF THE INVENTION

The aforementioned and other features are attained, according to the present invention, by providing, in a process control unit which includes redundant controllers, a technique for insuring that the identical data groups are stored in the global memory unit and the local memory unit of each controller and, furthermore, that the order in which the data groups are stored is the same. When a request to store data groups is forwarded to the primary (active) controller of a redundant pair of controllers, the primary controller executes the request but does not provide an acknowledgement response to the requesting unit. The primary controller transfers the request to the secondary controller of the pair of redundant controllers. The secondary controller then begins execution of the request and transmits to the primary processor the acknowledgement that the request has been successfully received by the secondary controller. The primary controller, only after receipt of the acknowledgement request from the secondary controller, transmits to the requesting unit, i.e., the plant control network, that the request has been successfully received by the process control unit. In this way, when the primary controller fails before the secondary controller is updated, then the requesting unit does receive an acknowledgement response sign which indicate that the current active (secondary) device is executing the request. When the backup (secondary) controller has failed, then the process control unit no longer has redundant controllers.

These and other features of the invention will be understood upon reading of the following description along with the drawings.

DESCRIPTION OF THE PREFERRED EMBODIMENT

1. Detailed Description of the Figures

Figure 1:
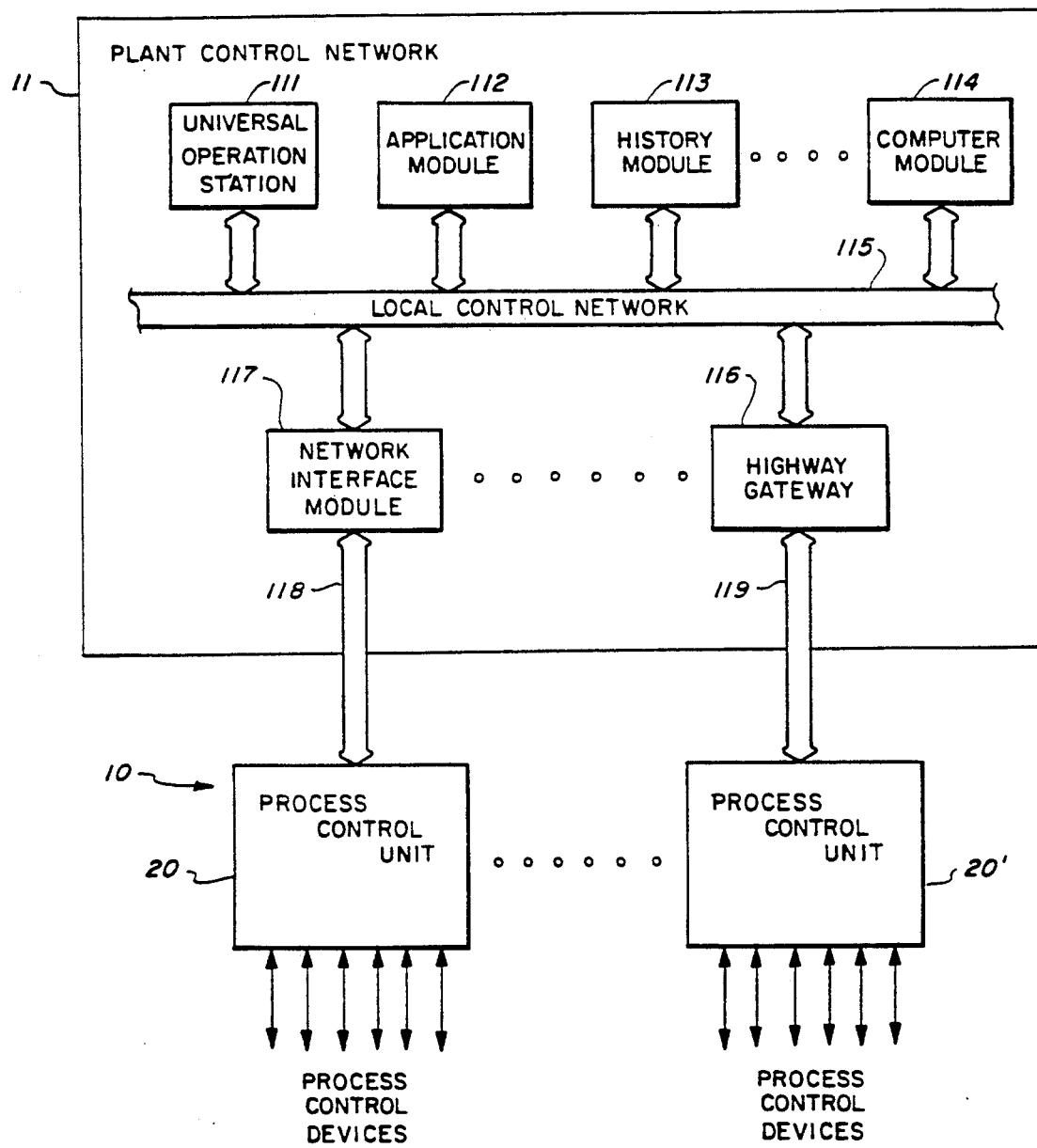
FIG. 1 is a block diagram of an example of a process control system capable of advantageously using the present invention.

Referring now to FIG. 1, the block diagram of a process control system 10 capable of using the present invention is illustrated. The process control system 10 includes a plant control network 11, at least one process, control unit 20 and/or process control unit 20', and coupled to each process control unit 20 and/or 20', at least one process control device. The process control devices (not shown) include gauges, valves, switches, etc. which exchange signals with the coupled process control unit(s) and which monitor and/or provide the control of the activity. The plant control network 11 includes a plurality of physical modules, i.e., the universal operator station 111, the application module 112, the history module 113, computer module 114. Also included is the network interface module 117 and the highway gateway 116. The modules of the plant control network 11 are coupled to a local control network (LCN) 115 used for exchanging signals therebetween using the protocol of the network. The universal operator station 111 provides the operator interface between the process control system 10 and an operator. The computer module 114 provides the processing capability for the process control system 10, the history module 113 provides the record of transactions of the process control system 10, and the application module 112 provides the programs and procedures for the process control network 11 and the process control unit 20,20'. The network interface module 117 provides an interface between the local control network 115 and the universal control network 118, the process control unit 20 being coupled to the universal control network 118. The highway gateway 116 provides an interface between the local control network 115 and the data highway 119, the process control unit 20' being coupled to the the data highway 119. A more complete description of the process control unit 20' can be had by reference to U.S. Pat. No. 4,296,464. A more complete description of plant control network 11 and the physical modules can be had by reference to U.S. Pat. No. 4,607,256.

Figure 2:
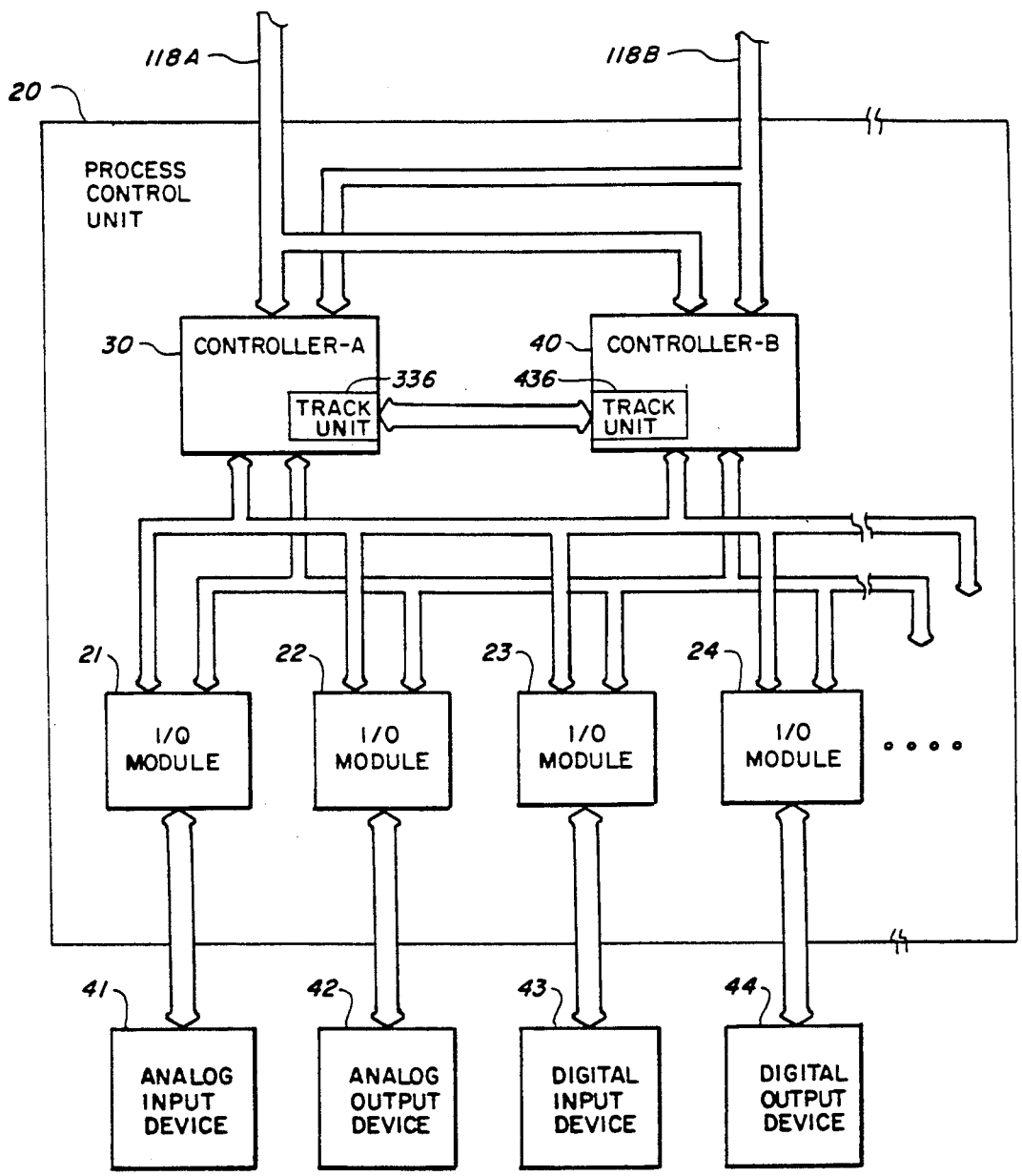
FIG. 2 is a block diagram illustrating the components of the process control unit according to the present invention.

Referring to FIG. 2, a block diagram of the principal components of the process control unit 20 are shown. The universal control network (UCN) 118 is divided into two portions, universal control network 118A and universal control network 118B. The process control unit 20 includes two redundant controllers, controller—A 30 and controller—B 40. Controller—A 30 includes a track unit 336 and controller—B 40 includes a track unit 436 through which the two controllers communicate. Controller—A 30 is coupled to both universal control network portion 118A and universal control network portion 118B, while controller—B 40 is also coupled to both universal control network portion 118A and universal control network portion 118B. The process control unit 20 includes I/O module 21 through I/O module 24. The I/O modules 21 through 24 are coupled by redundant signal paths to controller—A 30 and controller—B 40, respectively. I/O module 21 is coupled to analog input device 41, analog input device 41 being representative of analog gauges, sensors, etc. which provide analog signals in response to monitored activity or parameters. I/O module 22 is coupled to analog output device 42, analog output device being representative of valves, etc. which are responsive to the level of a signal provided by the coupled I/O module 22. I/O module 23 is coupled to digital input device 43, digital input device 43 being representative of timers, limit switches, etc. which provide a digital signal in response to process control unit activity or parameters associated with the process being monitored. I/O module 24 is coupled to digital output device 44, digital output device being representative of the devices such as relays, switches, etc. which control a process parameter or process activity in response to a digital input signal.

Figure 3:
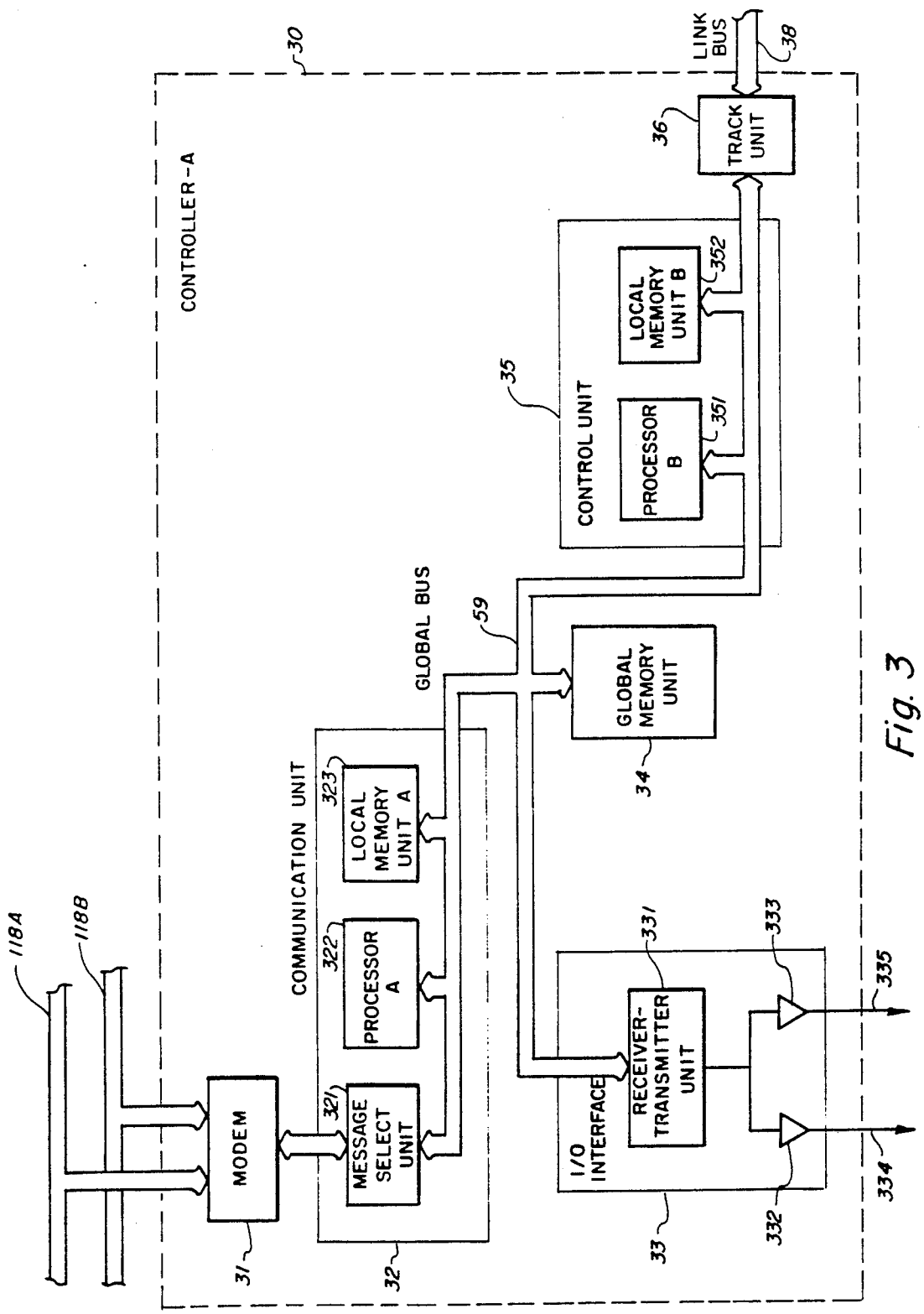
FIG. 3 is a block diagram of one of the redundant controllers of the process control unit.

Referring next to FIG. 3, a block, diagram of the controller—A 30 (or controller—B 40) is illustrated. Modem 31 is coupled to universal control network portion 118A and universal control network portion 118B, permitting the process control unit 20 exchanging signals with the plant control network 11. The modem 31 is coupled to the message select unit 321 of the communication unit 32. The message select unit 321, processor A 322 and local memory unit A 323 of communication unit 32 are coupled together and are coupled to global bus 39. The global bus 59 is coupled to global memory unit 34, to I/O interface unit 33 and control unit 35. In the I/O interface unit 33, the global bus 59 is coupled to a receiver transmitter unit 331. The receiver transmitter unit is coupled through driver 332 to bus 334 and through driver 333 to bus 335. In the control unit 35, the global bus 59 is coupled to processor b 351 and to local memory unit B 352. The, control unit 35 is coupled to track unit 336 and the track unit 336 is coupled to link bus 38. The link bus 38 connects between track units 336 of controller—A 30 and the track unit 436 of controller—B 40, as shown in FIG. 2.

Figure 4:
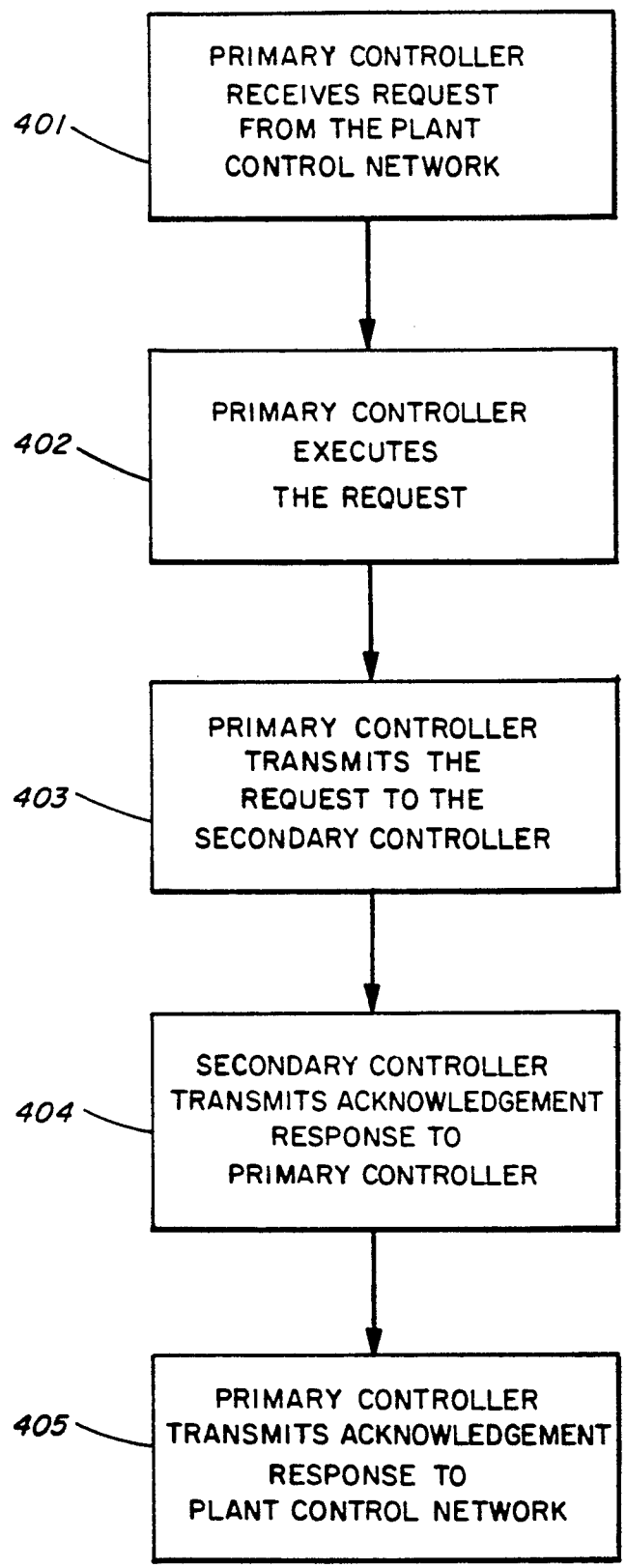
FIG. 4 is a flow diagram illustrating the procedure by which data stores in the storage unit of a primary controller of a process control unit are synchronized with data stores in a second controller of a process control unit.

Referring next to FIG. 4, a flow chart, indicating the steps of the process of the present invention, are shown. One of, the control modules of the plant control network 11 issues a request, typically a data group store request, to the primary controller of a redundant controller pair in step 401. (As discussed above, the process control unit 20, which implements the method of the present invention, includes a controller—A 30 and a controller—B 40. One controller (controller—A 30 or controller—B 40) operates as a primary controller and the other controller operates as a secondary controller (in more of a reserve mode than a back-up, in that if a failure of controller—A 30 should occur, controller—B is ready to take over the control function with essentially no start-up or initialization time). On a predetermined time basis, point processing is performed by the controller designated as the primary controller and communicates with the I/O modules 21, . . . In addition, the controller acting as the primary controller communicates with the plant control network 11 reporting status, history, and accepting inputs from the plant control network such as commands from the operator via the universal station 111.) In step 402, the primary controller, after validation, begins execution of the request. In step 403, the primary or active controller transmits the request to the secondary or backup controller. The secondary controller provides an acknowledge response of the receipt of the request to the primary controller in step 404. When the secondary controller is inactive (e.g., because of failure) or not present, then this fact is communicated to the primary controller, typically by a status signal. While the secondary controller is receiving and acknowledging receipt of the request, the primary controller continues to execute the request. In step 405, after the primary controller receives an acknowledgement response of the request by the secondary controller, or when the secondary controller is unable to provide the acknowledgment request, then the primary controller sends an acknowledgement response of the request to the plant control network indicating receipt of the request and subsequent activity.

2. Operation of the Preferred Embodiment

The present invention provides a technique for insuring that requests directed to the primary controller are also executed by the secondary controller in the same order as received by the primary controller. In addition, the present invention insures that the serialization of the requests, i.e., the order of execution, is identical in both controllers. This serialization is accomplished by requiring that both the primary and secondary controllers update the data base in the same order. The primary controller can act on a series of requests, but the requests are sent to the secondary controller in the same order as received by the primary controller. In the event that the secondary controller has failed, or is not present, the primary controller will provide an acknowledge signal to the member issuing the request. Because of the inoperability of the secondary controller in this event, the request can not be transferred thereto in any event.

In the preferred embodiment, the ultimate target of a (store) data request or action command, of the type envisioned by the present application, is the local memory unit 352.

The present invention is designed to operate in a process control system 10 of having the general structure indicated by FIG. 1. U.S. Pat. No. 4,607,256, cited above as a related application, provides a more complete description of the plant control network of the preferred embodiment.

In the preferred embodiment, modem 31 is a Concord Data Systems 5 mega-bit carrier band modem having two ports, thereby permitting the interfacing of the modem with the two portions of the universal control network 118. The message select unit 321 can be a token bus controller such as Motorola type 68824. The receiver transmitter unit 331 can be a universal asynchronous receiver/transmitter such as an Intel 80C31 microcontroller.

While the present invention has been described with particular reference to a process control network, it will be clear to those skilled in the art that the technique disclosed herein can be advantageously adapted in any processing system having redundant processors therein.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A processing unit coupled to a data processing system, said processing unit comprising a primary and a secondary controller, each controller including:
   i) decision means for determining which controller is the primary controller;
   ii) receiving means for receiving a communication from said data processing system, wherein said primary controller is an active controller and said primary controller receiving means receiving said communication;
   iii) processing means for processing said communication, wherein the processing means of said primary controller processes said communication prior to transferring said communication to said secondary controller, and wherein said primary controller transfers each of said communications to said secondary controller in an order received by the primary controller;
   iv) transfer means for transferring said communication between said primary and said secondary controller;
   v) first acknowledgement means for providing a first acknowledgement signal by said secondary controller to said primary controller indicating a successful receipt of said communication from said primary controller; and
   vi) second acknowledgement means, responsive to receipt of said communication and to receipt of said first acknowledgement signal resulting from transfer of said communication to said secondary controller, for providing a second acknowledgement from said primary controller to said data processing system, said primary controller providing said second acknowledgement signal in response to receipt of said communication alone when said secondary controller is inoperative.

2. The processing unit of claim 1 wherein said communication is selected from the group of communications including store instructions and active command instructions.

3. The processing unit of claim 2 wherein said processing unit is a process control unit and said communication is provided by a network interface module.

4. The processing unit of claim 3 wherein failure of either controller will not adversely effect processing of said communication.

5. The processing unit of claim 4 wherein said receiving means includes a communication unit, wherein said processing means includes control unit and a global memory unit, and wherein said transfer means includes a track unit.

* * * * *